No. 651,244. Patented June 5, 1900.
W. H. FORBES.
PROPELLING MECHANISM FOR BICYCLES.
(Application filed Sept. 9, 1899.)
(No Model.)
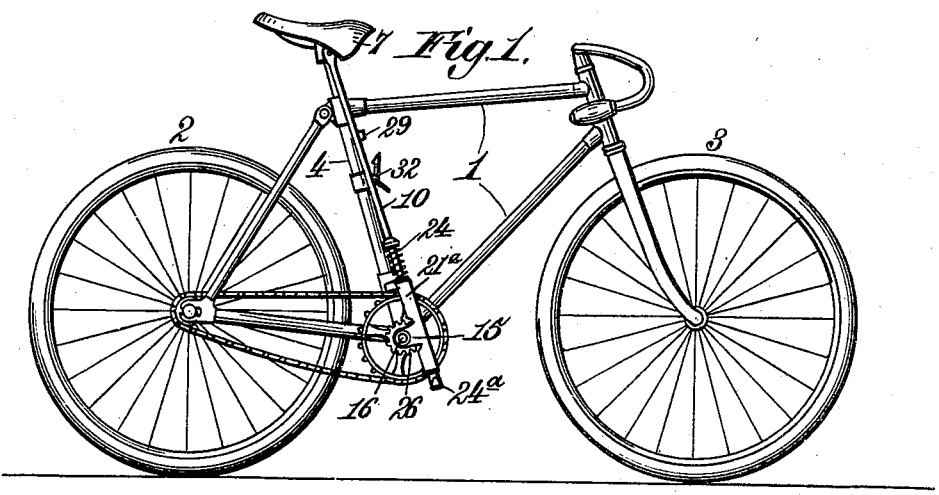
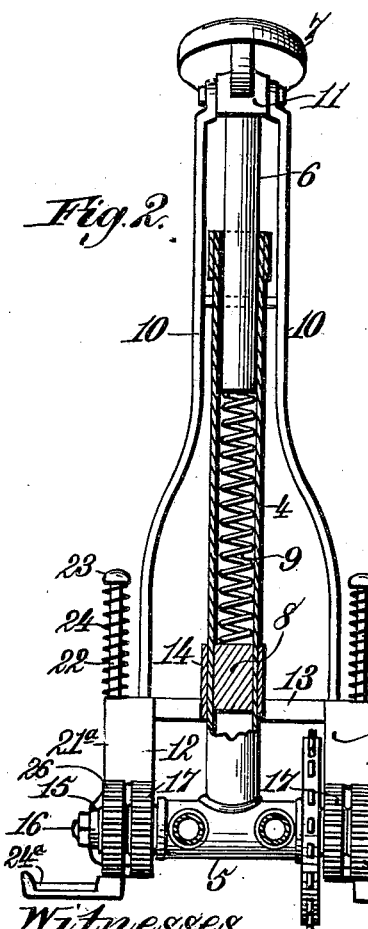
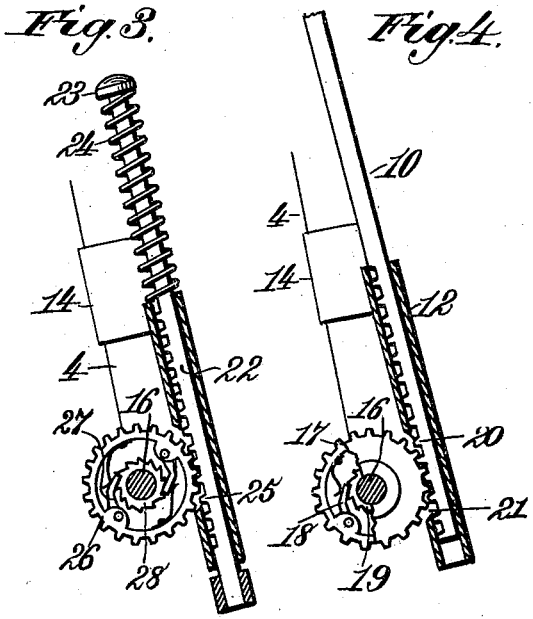
Witnesses.
Robert Ewalt.
J. Fred Kelley.
Inventor,
Wilson H. Forbes.
By James L. Norris
Atty.
THE NORRIS PETERS CO., PHOTO-LITHO., WASHINGTON, D. C.

UNITED STATES PATENT OFFICE.

WILSON H. FORBES, OF BEAVER FALLS, PENNSYLVANIA.

PROPELLING MECHANISM FOR BICYCLES.

SPECIFICATION forming part of Letters Patent No. 651,244, dated June 5, 1900.

Application filed September 9, 1899. Serial No. 729,986. (No model.)

*To all whom it may concern:*

Be it known that I, WILSON H. FORBES, a citizen of the United States, residing at Beaver Falls, in the county of Beaver and State of Pennsylvania, have invented new and useful Improvements in Propelling Mechanism for Bicycles, of which the following is a specification.

This invention relates to propelling mechanism for bicycles, and has for its object to provide improved driving mechanism by means of which the weight of the rider may be utilized and combined with the propulsive force of the legs to drive the bicycle and in which the propulsive force of the legs may alone be employed when desired.

It also has for its object to provide simple, efficient, and inexpensive mechanism of the character referred to which may be readily applied to bicycles of the ordinary and usual type now in general use.

To these ends my invention consists in the features and in the construction, combination, and arrangement of parts hereinafter described, and particularly pointed out in the claims following the description, reference being had to the accompanying drawings, forming a part of this specification, wherein—

Figure 1 is a view in side elevation of a bicycle provided with my improved propelling mechanism. Fig. 2 is a transverse vertical sectional view of the propelling mechanism. Fig. 3 is a detail sectional view of a part of the seat propelling mechanism, and Fig. 4 is a similar view of the foot propelling mechanism.

Referring to the drawings, the numeral 1 indicates the frame of an ordinary and well-known type of bicycle, and 2 and 3 the driving and steering wheels thereof. The seat-post tube 4 is hollow and extends from the axle-sleeve 5 to the upper part of the frame, as usual. The seat-post 6 is loosely arranged in the seat-post tube 4, so as to be freely movable vertically therein, and carries at its upper end a seat 7 of ordinary or any preferred construction. Fixed in the lower part of the seat-post tube 4 is a plug 8, on which rests one end of a coiled spring 9, disposed in said tube, the other end of the spring bearing against the lower end of the seat-post 6. The spring 9 operates to normally hold the seat raised, but should yield under the weight of the rider to permit the seat to descend. Two rods or bars 10 are attached at their upper ends to the opposite sides of the head 11 of the seat-post and at their lower ends are disposed and vertically movable in guide-sleeves 12. The sleeves 12 are preferably square in cross-section to conform to the corresponding shape of the bars 10, whereby the latter are prevented from turning, and at their upper ends are fixed in the opposite ends of a rigid arm 13, which intermediate its ends is formed with a collar 14, that is firmly fixed on the seat-post tube 4. The sleeves 12, near their lower ends, are formed with rearwardly-projecting lugs 15, which are fitted over the ends of the driving-axle 16 and operate to brace and hold said sleeves perfectly rigid.

Loosely arranged on the axle, near its opposite ends, are two gear-wheels 17, provided on their inner faces with pawls 18, that engage ratchet-pinions 19, fixed on the axle, the arrangement being such that when the gear-wheels are turned in one direction the pawls engage the ratchet-pinions and turn the axle; but when the gear-wheels are turned in the opposite direction the pawls ride idly over the ratchet-pinions without communicating movement to the axle. The lower portions of the bars 10 are toothed, as at 20, and the guide-sleeves 12 are each slotted on the rear side, as at 21. The gear-wheels 17 project through the slotted portions of the guide-sleeves and engage the toothed edges of the bars 10. Hence reciprocating movement communicated to the rack-bars will be transmitted to the gear-wheels 17 and the driving-axle 16. The driving-axle 16 is connected to the axle of the rear wheel by chain-and-sprocket gearing in the usual manner.

Fixed in the outer ends of the arm 13 are two depending guide-sleeves 21ª, similar in all respects to the guide-sleeves 12, before described, and disposed in said sleeves and vertically movable therein are two bars 22, provided at their upper ends with heads or shoulders 23. Arranged upon the upper portions of the bars 22 are coiled springs 24, each of which rests at its lower end on the upper end of the sleeve 21 and at its upper end bears against the shoulder 23. The lower ends of the bars 22 project through the sleeves 21, and each is provided with a stirrup or pedal 24, adapted to be engaged by the feet of the rider. The bars 22 are also provided with rack-teeth 25, which engage gear-wheels 26, provided with pawls 27, engaging ratchet-pinions 28, mounted on the driving-axle, precisely in the manner before described.

The operation of my improved driving mechanism is as follows: The rider seats himself in the seat with his feet upon the pedals 24. The weight of the rider causes the seat to descend, thus forcing down the rack-bars 10. The downward movement of the rack-bars 10 rotates the gear-wheels 17, which in turn rotate the ratchet-pinions 19 and turn the driving-axle, and the latter, through the medium of the chain and sprocket, turn the driving-wheel 2 to propel the bicycle forward. In the downward movement of the saddle the rider's legs are flexed, and as he straightens out his legs to raise himself the rack-bars 22 are thrust downward, and this movement of said rack-bars is transmitted to the driving-wheel in the same manner as that just above described. When the rider raises himself, the saddle is raised by the spring 9, thus returning the rack-bars 10 to their former position, the gear-wheels turning idly about the ratchet-pinions, and the rack-bars 22 are in like manner raised by the springs 24 when the saddle again descends. By raising and lowering himself in the manner described the rider alternately forces downward the rack-bars 10 and 22, thus communicating a continuous rotary motion to the driving-axle. At times when but little force is required to propel the bicycle the rider may remain seated stationary in the saddle and raise and depress his feet alternately, thus alternately depressing the rack-bars 22. The rack-bars 10 at such times remain stationary. In coasting both sets of rack-bars remain stationary, the pawls of the gear-wheels riding idly over the ratchet-pinions, whereby the movement of the driving-axle does not affect the driving mechanism.

At times it is desirable to hold the seat stationary in its lowered position, and for this purpose I have provided means constructed as follows: Attached to the rack-bars 10 is a metallic strap 29, and fixed on the seat-post tube 4 is a collar 30, provided with two lugs 31, between which is pivoted a latch 32, provided with a hooked upper end 33, adapted to engage the strap 29 and hold the seat-post down. The latch 32 is formed upon its inner side opposite its pivotal point with a projection 34, and fixed beneath the latch and between the lugs 31 is a flat spring 35, which is bent outward between its ends into V shape, as at 36. When the latch is turned into one or the other of its positions, the V-shaped portion of the spring will engage one side of the projection on the latch, and thus hold the latch in either its locked or unlocked position. The latch is especially useful in holding the seat in its lowered position while the rider mounts or dismounts and is easily reached by the rider while in the seat to either lock or unlock the latch.

By means of my improved propelling mechanism the rider may utilize his entire weight and apply it to the propulsion of the bicycle in addition to the power of his legs. Constructed as shown it is not necessary that the bicycle be especially constructed for the driving mechanism, as the latter may be readily applied to any of the well-known types of bicycles now in general use. It will be obvious that a single rack-bar 10 and its corresponding parts may be employed; but I prefer to employ the double arrangement shown, as the power is more equally applied to the driving-axle.

Having described my invention, what I claim is—

1. In a bicycle, the combination with a vertically-movable seat-post and means for transmitting the movement thereof to the driving-axle, of a latch pivoted intermediate its ends to the seat-post tube and arranged to engage an abutment movable with the seat-post to hold the latter in its lowered position, a projection formed on the inner side of said latch opposite its pivotal point, and a V-shaped spring attached to the seat-post tube opposite said projection for alternately engaging the latter to hold the latch in either of its adjusted positions, substantially as described and for the purpose specified.

2. In a bicycle, the combination with a transverse arm fixed on the seat-post tube, of two guide-sleeves fixed at their upper ends to the opposite ends of said arm, rack-bars movably arranged in said guide-sleeves and provided at their lower ends with pedals, coiled springs arranged on the upper portions of the rack-bars and resting at their lower ends on the said arm and bearing at their upper ends against shoulders on the upper ends of the rack-bars, gear-wheels loosely mounted on the driving-axle and engaging said rack-bars, pawls carried by the gear-wheels and ratchet-pinions fixed on the driving-axle and engaged by the said pawls, substantially as described.

In testimony whereof I have hereunto set my hand in presence of two subscribing witnesses.

WILSON H. FORBES.

Witnesses:
JAMES L. NORRIS,
F. B. KEEFER.